United States Patent

[11] 3,536,084

[72] Inventors Warren B. Depperman;
William Philip Dorsey, and Cornelius P. McKenzie, Winter Park, Florida

[21] Appl. No. 646,241
[22] Filed June 15, 1967
[45] Patented Oct. 27, 1970
[73] Assignee Martin-Marietta Corporation
New York, New York
a corporation of Maryland

[54] FLUIDIC OSCILLATOR
9 Claims, 3 Drawing Figs.

[52] U.S. Cl. .......... 137/815
[51] Int. Cl. .......... F15c 1/08, F15c 1/12
[50] Field of Search .......... 137/81.5

[56] References Cited

UNITED STATES PATENTS

| | | | |
|---|---|---|---|
| 3,057,551 | 10/1962 | Etter | 137/81.5X |
| 3,117,593 | 1/1964 | Sowers | 137/81.5X |
| 3,171,421 | 3/1965 | Joesting | 137/81.5 |
| 3,185,166 | 5/1965 | Horton et al. | 137/81.5 |
| 3,223,101 | 12/1965 | Bowles | 137/81.5 |
| 3,228,410 | 1/1966 | Warren et al. | 137/81.5 |
| 3,320,966 | 5/1967 | Swartz | 137/81.5 |
| 3,348,562 | 10/1967 | Ogren | 137/81.5 |
| 3,398,758 | 8/1968 | Unfried | 137/81.5 |
| 3,399,829 | 9/1968 | Richards et al. | 137/81.5X |

OTHER REFERENCES

" Generating Timed Pneumatic Pulses" R. E. Norwood, I.B.M. Technical Disclosure Bulletin, Vol. 5, No. 9 Feb., 1963, pp 13 and 14. (copy in Gp.362; 137/81.5 & Scien. Lib.)

*Primary Examiner*—Samuel Scott
*Attorneys*—Julian C. Renfro, William M. Hobby and Gay Chin

ABSTRACT: This invention relates to a multistage fluidic oscillator, constructed from a plurality of fluidic elements interconnected so as to form a timing chain, with the output from one element controlling the switching of the next element, and with the final element being arranged to control the switching of the first element. In accordance with this invention, one or more output elements are employed with the timing chain, with the loading of this output element significantly not affecting the frequency of oscillation of the timing chain. Further in accordance with this invention, we provide a plurality of cavities, disposed in the interconnections between the output of one element and the control port means of the next element so as to form a series arrangement of cavities. Because this series arrangement enables the cavities to be of small size, our oscillator is not limited to comparatively high frequency operation, as prior art devices were limited because of the comparatively large cavities that were necessary to be used therein.

Figure 1:
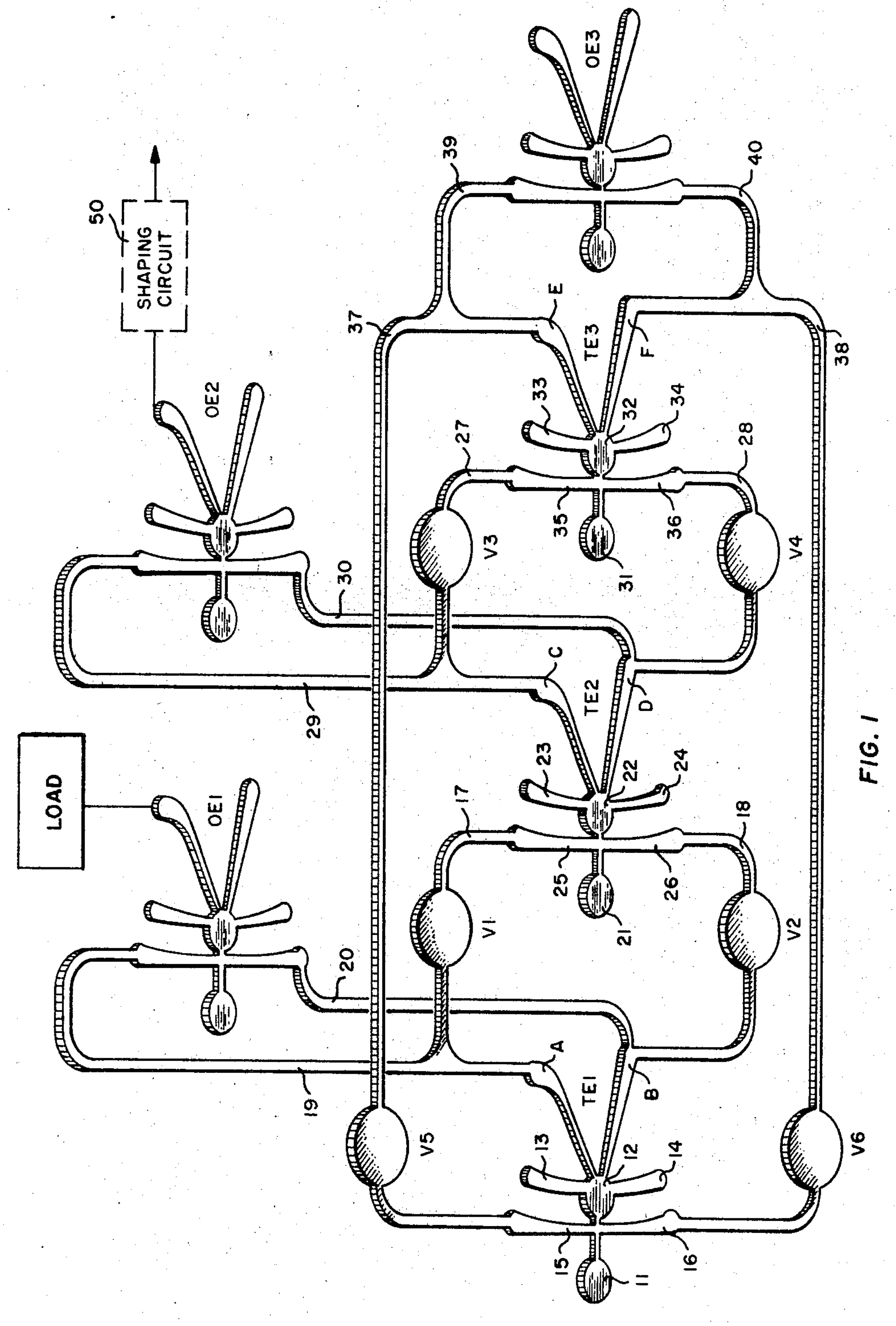

INVENTORS
WARREN B. DEPPERMAN
WILLIAM PHILIP DORSEY
CORNELIUS P. McKENZIE
BY Julian C. Renfro
ATTORNEY INVENTORS
WARREN B. DEPPERMAN
WILLIAM PHILIP DORSEY
CORNELIUS P. McKENZIE BY Julian L. Renfro
ATTORNEY

*INVENTORS*
WARREN B. DEPPERMAN
WILLIAM PHILIP DORSEY
CORNELIUS P. McKENZIE

BY Julian L. Renfro
*ATTORNEY*

FLUIDIC OSCILLATOR

This invention relates to a fluidic oscillator and more particularly to an oscillator operable over a wide frequency range, utilizing a number of fluidic elements arrayed in a timing chain, the arrangement being such that any of a number of operations may be carried out by means of output elements driven by the timing chain, which output elements may be loaded or otherwise utilized without affecting the desired oscillation frequency of the timing chain.

In the past, a number of fluidic oscillators have been proposed, with some of these involving a feedback connection between their output legs and their input. Obviously, many factors have to be taken into consideration and many adjustments made in an arrangement of this type, with the result that the oscillator is inherently not very stable, with any loading of the element making the frequency of oscillation even more unstable.

Other oscillators have been proposed in which the outputs of a first element are fed to the control port of a second element, with the outputs of the second element being connected to the control ports of the first element. The Fox U.S. Pat. No. 3,277,913 is typical of such an arrangement. This type device has little frequency adjustment capabilities and virtually no phasing capabilities. The extent of loading is very critical, and the utility of this device is accordingly very limited.

In accordance with the present invention, a very stable oscillator is provided utilizing a plurality of interconnected timing elements, with the number of such elements of course basically controlling the rate at which the device operates. In addition, selected ones of the timing elements may be provided with ouput elements, with this latter arrangement providing a desirable degree of isolation of the timing elements from the load, and providing frequency stability despite load impedance variations.

Our oscillator configuration provides certain cavity techniques for frequency adjustment that cannot be employed in conventional circuits. Although others in the past have utilized cavities or volumes in the connecting lines between fluidic elements, in all known instances, such prior art configurations have utilized only one or two of such cavities, the concept being that the sought-after delays could be accomplished by a minimum number of such cavities. Whereas if an oscillator is to run at several thousand cycles per second, the cavity can be quite small, even to the extent of reposing only in the interconnection lines themselves, if a rather slow output was desired, the cavity tended to be physically quite large. By the insertion of a probe in the cavity of such a device and displaying on a scope the input to the probe, it has been found that considerable noise level is created in such cavities, which of course limits effectiveness. The alternative of course is to utilize in accordance with the prior art concepts, cavities no larger than a certain size, but this of course establishes the minimum frequency of such prior art oscillators at a higher repetition rate than is often desirable.

In accordance with the present invention, the necessity for large cavities is circumvented, such being accomplished by the use herein of desirably small cavities, which are employed in a series type arrangement. This is to say, a signal in a control port of a first element causes a shift of that element and thereafter an output from a certain leg of that element, which passes through an appropriate small cavity, and thence to the control port of a second element of the chain of elements. This of course causes the second element to switch and to have an output, which passes through a second small cavity to the control port of a third element, which in turn delivers its output through another small cavity, and so forth through the chain of timing elements. In this manner, the requisite amount of delay is brought about, but in a very advantageous manner.

It is also significant to note in accordance with this invention that no effort is made to try to deliver an output directly from any element of the chain of elements, which of course would tend to load at least some of the elements, and to cause an aberration or fluctuation in the output of such element chain. Rather, in accordance with this invention, one or more output elements are provided, which are actuated by virtue of appropriate connections between the output legs of a timing element, and the control port means of the output element. In this manner, the loading of such output element does not affect the timing or performance of the timing chain.

The present invention is unique in providing almost complete isolation between the load and oscillating chain of elements. This of course is because the output element or elements, not being part of the oscillating chain, do not affect the stability of the output frequency of the oscillator despite variations of load impedance. Also, the output signal can be shaped by placing R-C networks on the output element, without affecting the basic oscillator characteristics.

Advantageously, our oscillator circuit has the capabilites of furnishing as many output signals as desired, with such outputs being phase-sequenced in time. For example, if there are four timing elements in the oscillator chain, and each is equipped with an output element, the circuit can then provide four different pairs of outputs, each pair consisting of two signals phase-shifted 180° with respect to each other, and each succeeding output pair phase shifted from the preceeding one by 90°. The amount of phase shift is of course adjustable by adding additional elements to the oscillator chain, or by changing the capacitance of the interconnecting volumes. This type of operation is of course not possible in conventional fluid oscillators.

It is therefore the principal object of this invention to provide a fluidic oscillator that is very stable, that is not affected by loading, but whose output frequency can be selectively varied over a wide range.

It is another object of this invention to provide an oscillator having lower power requirements and small weight, and which can be adjusted to oscillate at low frequencies.

It is a further object of this invention to provide an oscillator arranged to have outputs that can be selectively phase shifted.

It is yet another object of this invention to provide an oscillator utilizing a novel element configuration, by the use of which a complete oscillator can be packaged in a small volume.

Figure 2:
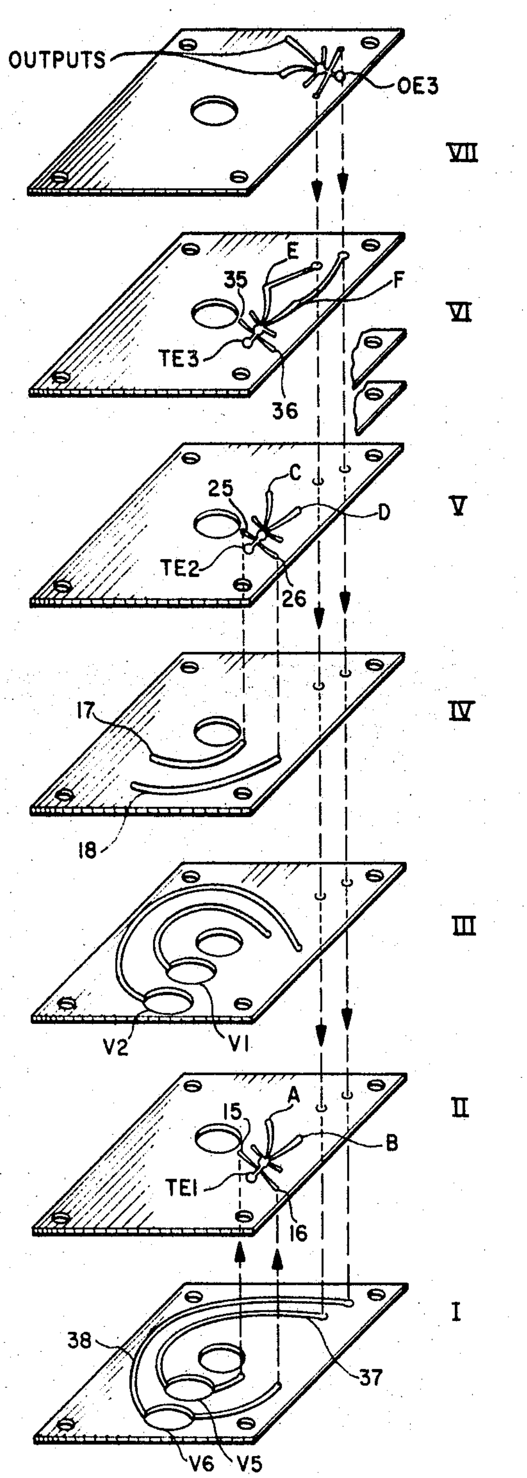
Figure 3:
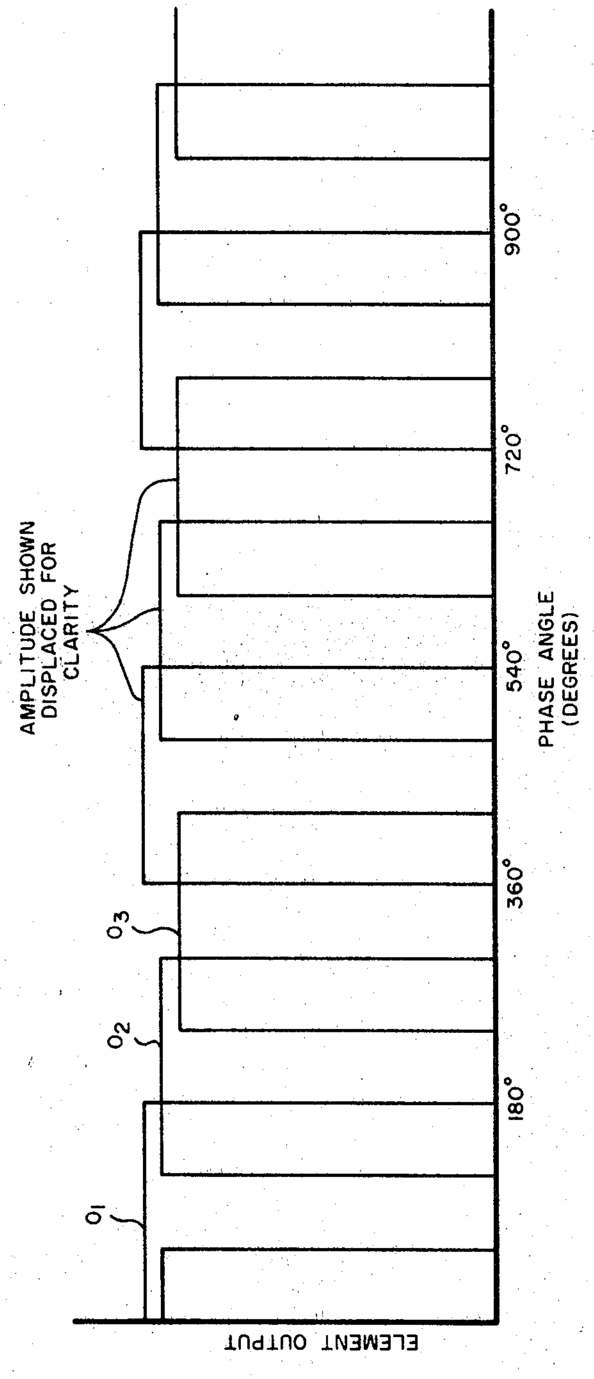

These and other objects, features and advantages will be more apparent from the study of the enclosed drawings in which:

FIG. 1 is an idealized schematic view of a three stage oscillator in accordance with this invention, in which each of the elements of the oscillator chain is equipped with an output element;

FIG. 2 is an exploded view revealing the construction of a typical oscillator in accordance with this invention, utilizing an integrated circuit technique in which a number of element planes are secured together so as to dispose the entire oscillator in a small, highly effective volume; and FIG. 3 is a timing diagram illustrating the interrelationships of the outputs from the several output elements.

Turning to FIG. 1 it will be noted that an oscillator employing three timing elements is shown, these being TE1, TE2 and TE3. In this device, the outputs of each element are connected to the input of the next element, with the result that these three elements are interconnected into a timing chain.

While our invention can be used in a number of different ways, and with a number of different fluidic elements, we prefer to use a modular technique in which a number of stacked planes are employed, certain ones of which utilize the miniature elements taught in the copending U.S. Pat. application of Richards and Depperman, entitled "High Speed Fluidic Devices", Ser. No. 546,935, filed May 2, 1966. Such elements are specified not only for their small size and high speed, but also because of the great stability which can be achieved by the use of such elements instead of the more common, large elements. Also, we may use a different number of timing elements than three, but this number was chosen for illustration rather than two or four, inasmuch as when an odd number of elements are used, it is not necessary to have any feedback channels crossing. Obviously, if an oscillator is being built to oscillate at a low frequency, a large number of elements may be used.

It will be noted in FIG. 1 that element TE1 is equipped with a power input port and nozzle 11, an interaction zone 12, and vents or bleed ports 13 and 14. The fluid supplied to the nozzle flows into the interaction zone 12, and thence into the output leg A or B, the precise leg in which the flow takes place being dependent upon whether a signal has just been received in signal port 15, or in signal port 16. As will be understood by those skilled in the art, if flow is taking place through left leg A, upon a signal being received at the control port 15, the flow is caused to cease in leg A and to commence in leg B. Such switching can occur in as short a time as 30 microseconds, for example. Vents 13 and 14 are preferably used inasmuch as they tend to enhance operating characteristics in a number of ways. The channels normally associated with the use of such vents are omitted for clarity reasons.

Additional details of these novel elements can be obtained from a study of the above-mentioned copending application of Richards and Depperman.

Legs A and B are in turn connected so that at least part of the flow therefrom can flow through passages 17 and 18 and enter control ports 25 and 26, respectively, of the second timing element, TE2. As will be understood, flow from power input port and nozzle 21 of the second element can flow into its interaction zone 22, and thereafter be switched between legs C and D, the position of the flow at at any instant depending whether it was from control port 25 or 26 that a signal was last received.

It is important to note that appropriately sized cavities $V_1$ and $V_2$ may be disposed in passages 17 and 18, which cavities may be configured so as to control the switching delay between timing elements TE1 and TE2, and thus enable the phasing of the output of the device in a desired manner.

Passages or channels 19 and 20 may also connect to legs A and B, respectively, so as to carry at least part of the flow from the output legs of the timing element TE1 to the control ports of output element OE1, if the use of an output element is desired in connection with TE1. The function of the output elements will be discussed in greater detail hereinafter.

Returning to the operation of timing element TE2, flow from leg C may enter a channel 29, and connect to a control port of the output element OE2 (if such is used in connection with this timing element), whereas flow from leg D may take place through channel 30 to the other control port of OE2. Flow from legs C and D also flows through channels 27 and 28, and may pass through cavities $V_3$ and $V_4$ in flowing to control ports 35 and 36 of TE3.

Fluid emanating from the supply port and nozzle 31 of TE3 flows across interaction zone 32 and then flows into either leg E or F, depending whether it was from control port 35 or 36 the last signal took place. Some of the flow into leg E flows through passage 37 back to control port 15 of timing element TE1, thus on occasion controlling its position. Similarly, some of the flow from output leg F flows through passage 38 back to control port 16 of element TE1, thus completing the timing chain. Appropriately, cavities $V_5$ and $V_6$ may be desirably interposed in channels 37 and 38 so that the speed of oscillation can be closely controlled. As will be seen, by the sizing of the cavities, and perhaps by changing the number of elements in the timing chain, the frequency of oscillation of our oscillator can be changed over a range of three orders of magnitude, for example.

As will be obvious, flow from legs E and F also flows through passages 39 and 40 to the control ports of output element OE3, the output from which may be utilized as desired.

Manifestly, as many output elements may be used as there are timing elements, with the output from each output element being in phased relationship to the output of the other elements. Each of the illustrated output elements can be connected to additional elements, directly to items to be actuated, or to a shaping circuit before being connected to such an item.

As an example, a shaping circuit 50 is illustrated in one of the output legs of OE 2, which shaping circuit can, for example, be constituted by a pair of resistances and a cavity, which of course constitute an RC network.

In order that this invention can be visualized in a form more nearly resembling actual hardware, reference is made to FIG. 2, wherein seven exemplary circuit planes are shown, these bearing numbers I through VII. Commencing with plane I it will be noted that flow takes place into control ports 15 and 16 associated with timing element TE1 that resides in plane II. The output from output legs A and B of TE1 flows into cavities $V_1$ and $V_2$ located in plane III and from this flows via the pair of passageways 17 and 18 disposed in plane IV into the control ports 25 and 26 of element TE2 that appears in plane V. In the interests of clarity, we have omitted subsequent to element TE2 the two planes corresponding to planes III and IV , with only corners of the omitted planes being visible between planes V and VI. The first omitted plane contains additional cavities and channels similar to plane III, whereas the second omitted plane contains channels similar to those shown in plane IV, these two planes serving to connect the outputs C and D of timing element TE2 to the control ports 35 and 36 of TE3, which resides in plane VI.

The outputs from legs E and F of TE3 flow downwardly through apertures formed in intervening planes to passages 37 and 38 leading to cavities $V_5$ and $V_6$ of plane I, which in turn connect to the control ports 15 and 16 of TE1. As will be understood, output from legs E and F are also connected to control ports of output OE3, which is disposed in plane VII. The appropriate outputs of this latter device may of course be connected to a shaping circuit, to additional elements, or the like.

Thus, it will be seen that by the use of nine or so planes and of course appropriate cover plates and the like, a chain of timing elements has been created so as to occupy only an exceedingly small space. For example, each of the element planes may be made of copper, an inch or so on a side, and of a thickness in the vicinity of .004 inches to .010 inches.

It should be noted that an oscillator may well include additional planes that utilize cavities, which planes would of course be placed adjacent to planes I and III, for example, so as to build up the height of such cavities, and thereby lower the frequency of operation of the device. For example, in one particular oscillator, we used three planes for each pair of cavities defined, but with only one of such planes containing the connecting channels.

It is not to be presumed from FIGS. 1 and 2 that we are limited to three timing elements, or to an odd number of timing elements, for a large number of elements may be employed, with dozens or even hundreds of logic planes involved. The problem of crossover of the feedback channels in the event of the use of an even number of elements in the timing chain can of course be remedied by the use of one or more planes containing passages concerned with crossover, such as were illustrated in planes II and III of FIG. 2 of the copending "High Speed Fluidic Devices" patent application.

Reference should be made to FIG. 3 in connection with the timing diagram representative of the outputs of the three output elements employed in the device shown in FIG. 1. Although in FIG. 1 we employ three output elements, arranged to have equal, symmetrical outputs, it is of course to be understood that we can, by sizing the cavities, avoid the use of as many output elements as there are timing elements, and also by appropriate sizing, we can achieve nonsymmetrical outputs from the output elements, if such be desired.

As previously mentioned, each circuit plane is preferably made of copper foil, because of the comparative ease with which known etching techniques may be employed to create logic elements usable in accordance with this invention. Also, copper foils are preferred from the standpoint of manufacture, for a desired number of foils may be satisfactorily secured together in a preestablished relationship either by clamping, screwing, or suitable bonding technique. However, it is within the contemplation of our invention to use foils of brass, copper-brass alloy, or even stainless steel if such be desired, with these of course being used in the thickness desired.

As will be apparent, each logic plane is prepared in accordance with a preestablished standard and basically involves the use of three types of interconnections; power supplies, vents, and signal passages, with it also being evident that several logic elements may be disposed in each logic plane. However, for the sake of simplicity we are illustrating in the planes of FIG. 2, only signal passages.

The elements of each plane may, as shown in FIG. 2, be arranged around a common central vent to facilitate simultaneous venting on the inside as well as on the outside of the stack. Appropriate power supply ports may be disposed adjacent to the elements, or perhaps more accurately, the elements may be disposed in such a manner as to partake of the source of fluid power available at power supply ports.

As an example of pressures, the supply pressure can range between a fraction of a pound and a 100 or so pounds. Frequencies of operation can range between 10 cycles/sec. and 10,000 cycles/sec.

Although we prefer the use of bistable fluidic elements, we can of course utilize monostable elements in our oscillator is such be preferred.

Also, an output element can be arranged to drive a series of output elements, which of course gives a form of phasing.

We claim:

1. A fluidic oscillator of the type designed to cooperate with a load in an isolated manner, said oscillator comprising: a plurality of interconnected active fluidic timing elements, each of said elements having a supply port, an external supply source connected to said supply ports, at least one output leg, and control port means for determining the output leg out of which the fluid supplied by supply port will flow, said elements being connected such that at least some of the flow from at least one of the output legs of each timing element will flow through a control port of another timing element, thus forming a timing chain, and at least one output element connected in intercommunicating relation between the load and at least one of said timing elements, thus to isolate said timing elements from the load so that the output frequency of the oscillator remains stable despite variances in load impedance.

2. The fluidic oscillator as defined in claim 1 in which at least two output elements are utilized in connection with said chain of elements, such that the outputs of said output elements are in phased relation with each other.

3. The fluidic oscillator defined in claim 1 in which each of the outputs of the elements of said chain of elements is connected to a control input of a respective output element, such that the outputs of said output elements are in phased relation with each other.

4. The fluidic oscillator as defined in claim 1 in which at least one output element is utilized in connection with said timing chain, which output element is arranged to drive at least one other output element, and thus furnish additional phasing capability.

5. The fluidic oscillator as defined in claim 1 in which cavities of preestablished size are interposed in the connections between the output legs of one element and the control ports of the next element, whereby the speed of oscillation of said oscillator can be selectively varied.

6. The fluidic oscillator as defined in claim 1 in which said fluidic elements are disposed in element planes of thin material.

7. A fluidic oscillator of the type designed to cooperate with a load which communicates in an isolated manner with the fluidic oscillator, said oscillator comprising: a plurality of active binary, fluidic timing elements arranged in successive communicating fashion; each of said timing elements including a supply port, control port means, and a plurality of output legs; said output legs of each timing element communicating with the control port means of the next successive timing element so as to define a timing chain; at least one output element including control port means, said output element connected to said chain in intercommunicating relation between the load and at least one of said timing elements such that said output element control port means communicates with said output legs along with the control port means of the next succeeding timing element; whereby the output frequency of the oscillator remains stable despite variance in load impedance.

8. The fluidic oscillator as defined in claim 7 in which at least two output elements are each connected to said timing chain in intercommunicating relation between the load and a timing element, such that the frequency of said chain is unaffected by variance in load impedance, and wherein the outputs of said output elements are in phased relation with each other.

9. The fluidic oscillator as defined in claim 7 in which at least one output element is connected to said timing chain, which output element is arranged to drive at least one other output element, and thus furnish versatile phasing capability.